(No Model.)
J. H. GROSS.
VEHICLE WHEEL.
No. 451,858. Patented May 5, 1891.
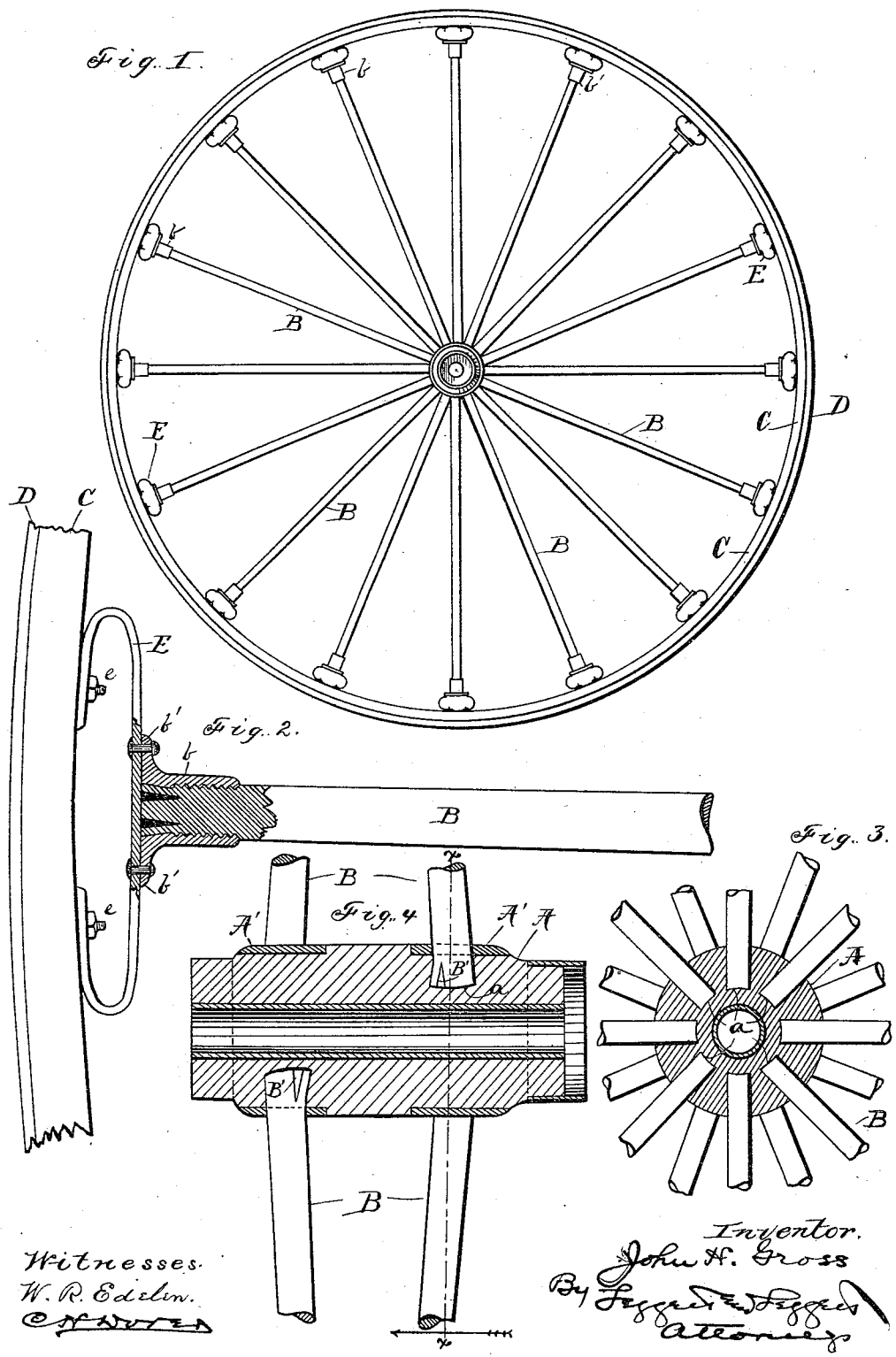
Witnesses
W. R. Edelin.
C. N. Noyes
Inventor.
John H. Gross
By Leggett & Leggett
Attorneys

United States Patent Office.

JOHN H. GROSS, OF NORWALK, OHIO.

VEHICLE-WHEEL.

SPECIFICATION forming part of Letters Patent No. 451,858, dated May 5, 1891.

Application filed December 19, 1890. Serial No. 375,255. (No model.)

*To all whom it may concern:*

Be it known that I, JOHN H. GROSS, of Norwalk, in the county of Huron and State of Ohio, have invented certain new and useful Improvements in Vehicle-Wheels; and I do hereby declare the following to be a full, clear, and exact description of the invention, such as will enable others skilled in the art to which it pertains to make and use the same.

My invention relates to improvements in vehicle-wheels designed more especially for sulky or other light vehicles, in which the spokes are connected with the rim of the wheel by means of suitable springs.

My invention also relates to other details of construction hereinafter described, and pointed out in the claims.

In the accompanying drawings, Figure 1 is a side elevation. Fig. 2 is an enlarged side elevation in detail, portions being broken away to show the construction. Fig. 3 is a cross-section, and Fig. 4 is a longitudinal section, through the hub, showing the manner of securing the spokes in the hub.

A represents the hub of the wheel; B B B, the spokes; C, the rim of the wheel; D, the tire, and E springs interposed, respectively, between the ends of the spokes and the wheel-rim. A spoke that is shouldered either at the hub or at the rim, or both, more especially if the parts are light and the vehicle be used for fast driving, is likely to split at the shoulder or shoulders thereof. To overcome this difficulty, I provide spokes without shoulders, and to this end the hub is not mortised through the bore thereof; but instead sufficient metal is left at the bottom of each mortise, as at $a$, for the end of the spoke to abut against, and hence no shoulders are required on the spokes to engage the periphery of the hub. The end walls of the mortise are undercut, as shown, for dovetailing in the spokes, and one or more wedges B' are used in driving the spoke to distend or spread the end of the spoke to fill the mortise. The spokes are well staggered, as shown in Fig. 4, and the hub is provided with broad metal bands A' A', mortised to register with the mortises in the hub, so that the spokes extend through the mortises in these bands, the spokes when assembled preventing the possibility of any displacement of the bands, and the bands relieve the hub in a measure from extra strain in a direction that would split the hub and also re-enforce the hub, so as to prevent the possibility of such fracture or splitting. On the outer end of each spoke is mounted a metal sleeve $b$, the sleeve being screw-threaded internally, the screw-threads of the sleeve cutting corresponding threads on the spokes in assembling the parts. The bore of each sleeve is slightly conical or flaring opposite the end section of the spoke, and the end of the spoke is expanded by one or more wedges, whereby the sleeve is held from drawing off the spoke, even were the screw-threads worn away or omitted. The sleeve has ears or flanges $b'$ for attaching a spring—for instance, spring E. The form of the spring shown is preferable for the purpose where an ordinary wooden rim and metal tire are used; but the form of the spring may be varied indefinitely, according to circumstances. The spring is shown riveted to the ears of the sleeve, and the free ends of the spring are shown doubled back and bolted to the inner side of the rim, the securing-bolts $e$, known as "tire-bolts," extending through the springs, wooden rim, and tire. The springs render the wheel less rigid than it would otherwise be, and in fast driving these springs relieve the other parts of the vehicle from much jarring and vibration, and in passing obstructions the force of the blow, which is ordinarily sustained by one or two spokes, is distributed among a number of spokes, by reason of the springs of the spokes next the engagement of the obstruction yielding a trifle, and the same may be said in regard to distributing the load to a large number of spokes at a time.

In assembling the parts the sleeves are screwed onto the spokes until the sleeves are at the proper radial distance from the center of the wheel, and the protruding ends of the spokes are cut off flush with the outer face of the sleeve. Hence when the springs are riveted on, the ends of the spokes abut these springs, so that the end-thrust on the spokes at the outer ends is not sustained alone by the screw-threading, but is sustained in the main by the springs, and as the distance between the securing-rivets is short the springs offer a rigid abutment for the ends of the spokes. With such construction it is evident that if the wheel-rim shrink or expand it will not strain the wheel, springs E accommodating such expansion or contraction. Hence if a tire be a little tight there is no harm done, and a tire will likely be worn out without resetting.

What I claim is—

1. In a vehicle-wheel, in combination, wheel-rim, spokes, and intervening springs, and an internally-screw-threaded sleeve mounted on the spokes, a spring being fastened to such sleeve and to the opposing section of the wheel-rim, substantially as set forth.

2. In a vehicle-wheel, the combination of spokes, wheel-rim, and springs interposed between the rim and the respective spokes, the spokes having mounted thereon sleeves bearing ears for attaching the spring, each spring also being fastened to the wheel-rim, substantially as set forth.

In testimony whereof I sign this specification, in the presence of two witnesses, this 21st day of October, 1890.

JOHN H. GROSS.

Witnesses:
C. H. DORER,
WARD HOOVER.